United States Patent [19]

Bohlin et al.

[11] 4,027,736

[45] June 7, 1977

[54] LOAD-WEIGHING DEVICE

[75] Inventors: Karl Gunnar Bohlin, Sundsvall; Karl Rune Eriksson, Kvissleby; Carl-Erik Gustafsson, Sundsvall, all of Sweden

[73] Assignee: SCA Development Aktiebolag, Sundsvall, Sweden

[22] Filed: Feb. 25, 1976

[21] Appl. No.: 661,194

[30] Foreign Application Priority Data

Mar. 14, 1975 Sweden .............................. 7502903

[52] U.S. Cl. ............................. 177/147; 177/DIG. 9
[51] Int. Cl.² ........................................ G01G 19/18
[58] Field of Search ............. 177/147, DIG. 9, 211; 73/141 A, 141 R

[56] References Cited

UNITED STATES PATENTS

| | | | |
|---|---|---|---|
| 2,820,624 | 1/1958 | Koegel | 177/147 |
| 3,621,927 | 11/1971 | Ormond | 177/211 |

*Primary Examiner*—Joseph W. Hartary

*Attorney, Agent, or Firm*—Lerner, David, Littenberg & Samuel

[57] ABSTRACT

A load-weighing device for indicating the weight of a load is provided for attachment to the load-carrying member of a lifting device. The load-weighing device includes a frame connected to the load-carrying member and a bearing block mounted in the frame for rotation relative to the load-carrying member. A clearance space is provided between the lower surface of the bearing block and the frame which is eliminated upon the application of a load. A bearing member is also mounted in the frame and includes a cylindrically-shaped lower surface which is arranged to abut a cylindrically-shaped upper surface of the bearing block. The bearing member is provided with a recess for receiving a pressure-sensitive member so that when a load is lifted by the load-carrying member, the force of the load is transferred to the pressure-sensitive member which operates to provide a load-measuring value to a receiver.

4 Claims, 9 Drawing Figures

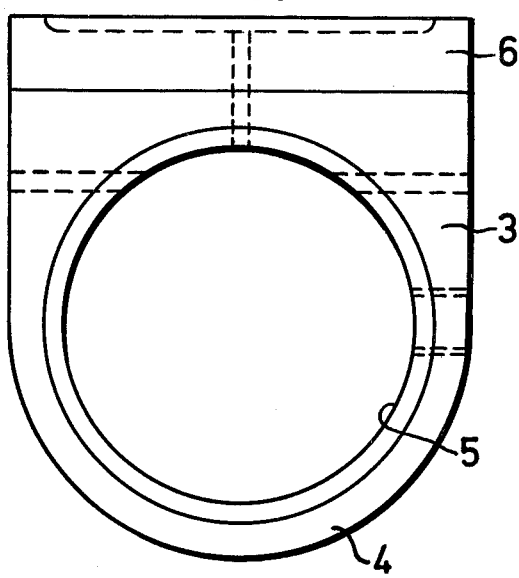
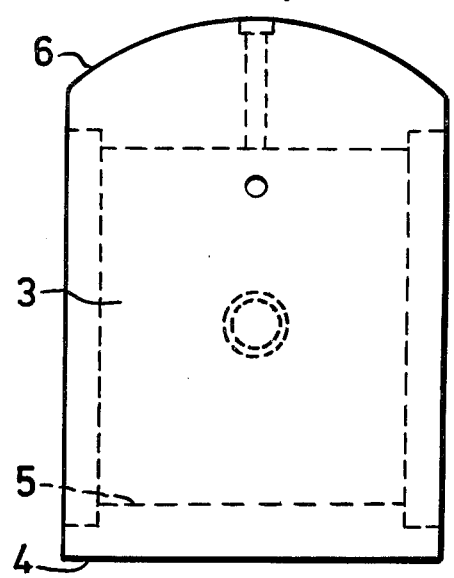
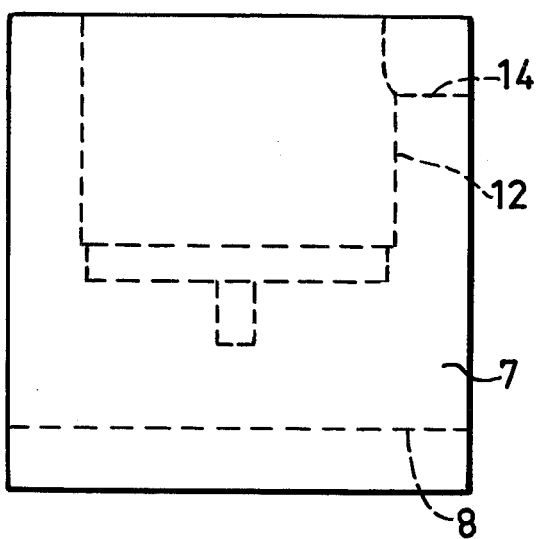
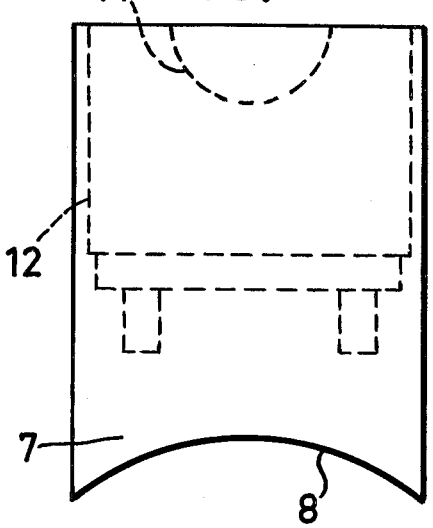
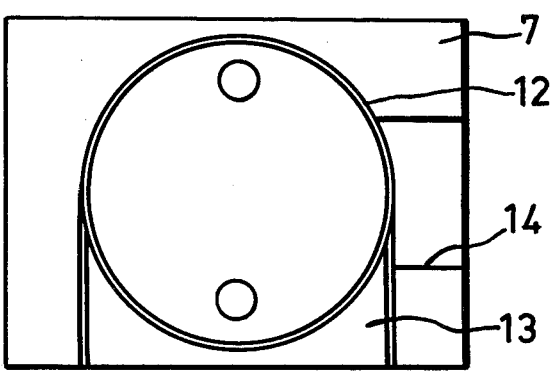

LOAD-WEIGHING DEVICE

FIELD OF THE INVENTION

The present invention relates generally to load-weighing devices, and specifically to an improved load-weighing device which is constructed and arranged so that an uneven or skewed distribution of the load, or a non-planar positioning of the lifting device does not affect the accuracy of the measuring of the weight of the load.

BACKGROUND OF THE INVENTION

Load-weighing devices are well known in the art. Typically, a lifting device, such as a crane, is provided with a load-weighing device to cumulatively indicate the weight of the loads picked up and transported by the crane. However, in many instances, the load is not evenly balanced within the jaws of the crane, and this imbalance operates to affect the accuracy with which the load is measured. In addition, in many instances, the terrain on which the crane operates is uneven so that the crane itself is off center and may also operate to affect the accuracy of measuring the weight of the load. Accordingly, it would be desirable to provide a load-weighing device which measures the weight of a load accurately and is not affected by an uneven distribution of the load within the jaws of a crane and is also not affected by a non-planar positioning of the crane on a rough terrain.

Broadly, it is a object of the present invention to provide an improved load-weighing device which solves one or more of the aforesaid problems. Specifically, it is within the contemplated of the present invention to provide a load-weighing device which is constructed and arranged to accurately measure the weight of a load and is unaffected by the non-planar positioning of a lifting device, or an uneven or skewed distribution of the load in the load-carrying member of the lifting device.

SUMMARY OF THE INVENTION

Briefly, in accordance with the principles of the present invention, there is provided an improved load-weighing device for indicating the weight of a load lifted by a suitable lifting device, such as a crane. A frame of the load-weighing device is connected to the load-carrying member of the lifting device, and a bearing block is mounted in the frame for rotation relative to the load-carrying member. A bearing member is also mounted in the frame and is provided with a lower cylindrically-shaped surface which is arranged to abut the upper cylindrically-shaped surface of the bearing block. The bearing member is provided with a recess in which a pressure-sensitive member is mounted. The frame is provided with a removable plate for covering the recess and which may be removed therefrom for access to the pressure-sensitive member. In operation, the force of the load is transferred from the load-carrying member to the frame and through the pressure-sensitive member, the bearing member and the bearing block to the lifting device. The compression of the pressure-sensitive member operates to deliver a load-measuring value to a receiver. The bearing block is mounted in the frame so that a clearance space is provided between the lower surface of the bearing block and the frame which clearance space is eliminated upon the application of a load, so that the pressure-sensitive member is relieved.

Advantageously, the present invention provides an accurate indication of the weight of the load even if the load is unevenly distributed within the load-carrying member, and even if the lifting device is in a non-planar position on a rough terrain. More particularly, because of the cylindrically-shaped surfaces of the bearing block and bearing member, which are in contact with each other, a change in the angle of the bearing block of the load-weighing device relative to the load-carrying member will not affect the accuracy of the measuring of the weight of the load. The pressure-sensitive member is compressed along its longitudinal axis even when the load is unevenly distributed, or when the lifting device is in a non-planar position, and causes movement of the bearing block relative to the load-carrying member.

BRIEF DESCRIPTION OF THE DRAWINGS

Further objects, features, and advantages of the present invention will become apparent upon the consideration of the following detailed description of a presently-preferred embodiment when taken in conjunction with the accompanying drawing, wherein:

FIG. 3 is a side view of the bearing block of the present invention;

FIG. 4 is an end view of the bearing block;

FIG. 5 is a side view of the bearing member of the present invention;

FIG. 6 is an end view of the bearing member; present

FIG. 7 is a cross-sectional view of the bearing member;

DETAILED DISCUSSION OF PREFERRED EMBODIMENT OF THE INVENTION

Figure 1:
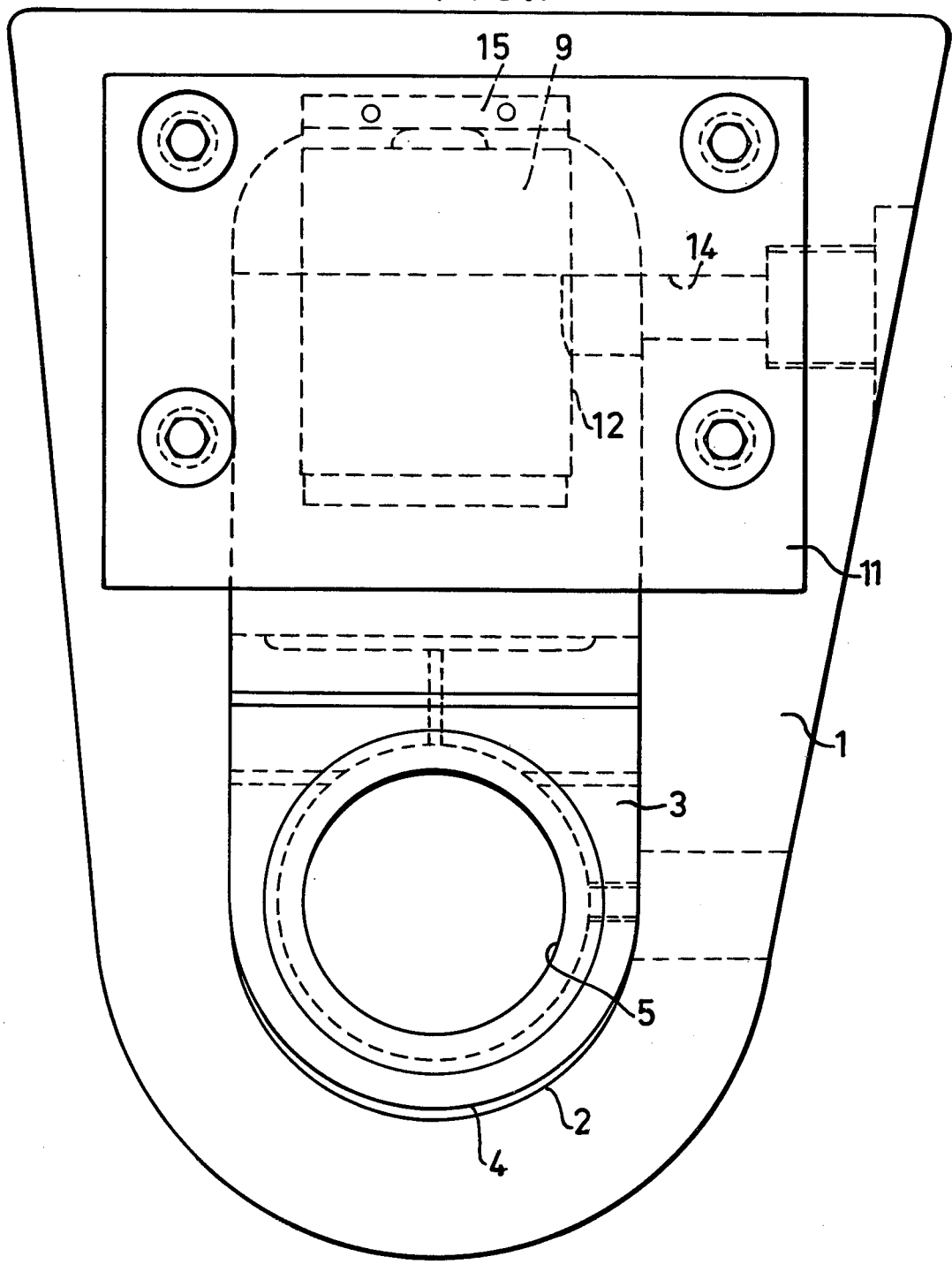
FIG. 1 is a side elevational view of the load-weighing device of the present invention.
Figure 2:
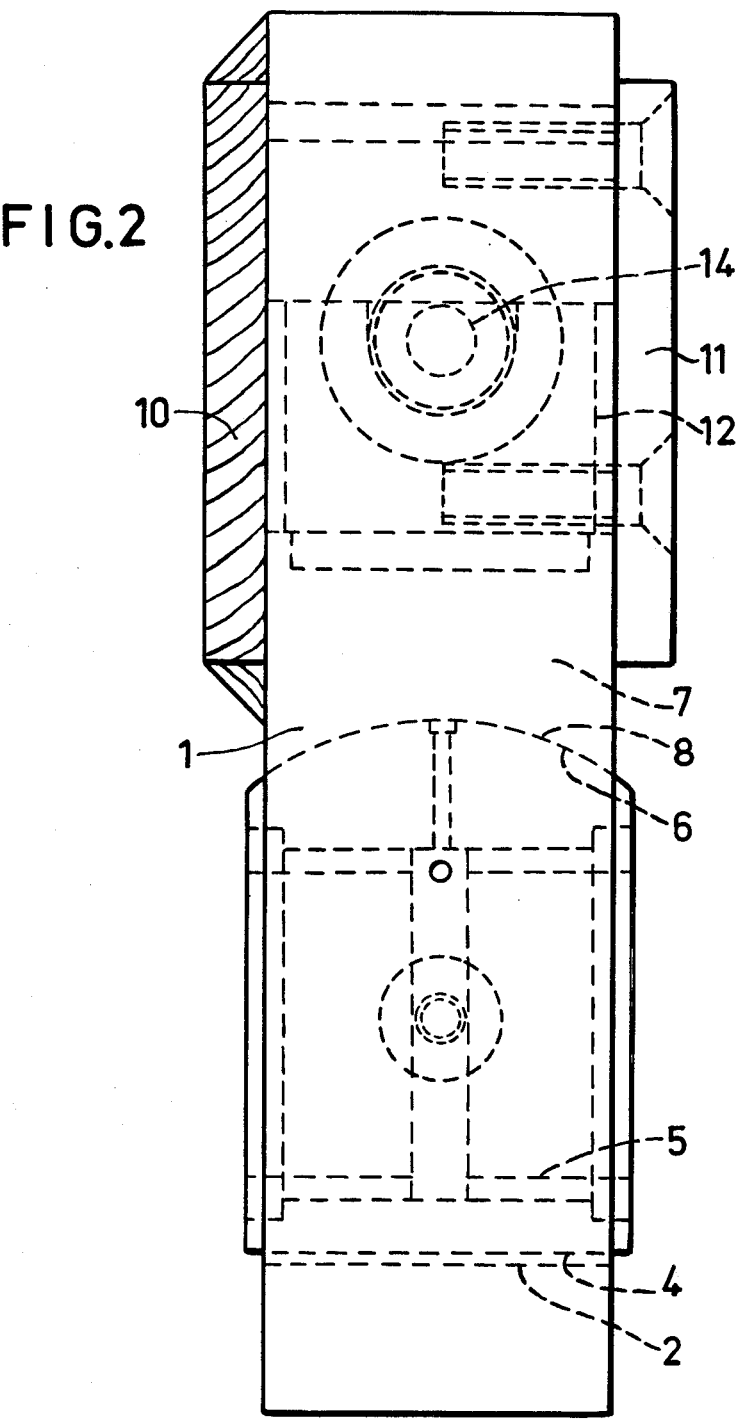
FIG. 2 is an end elevational view.
Figure 9:
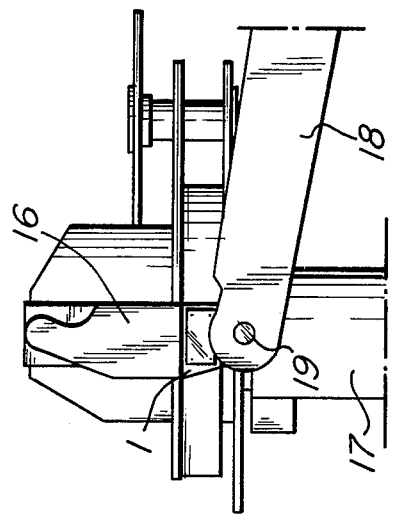
FIG. 9 is an end elevational view of the load-weighing device and lifting device shown in FIG. 8.
Figure 8:
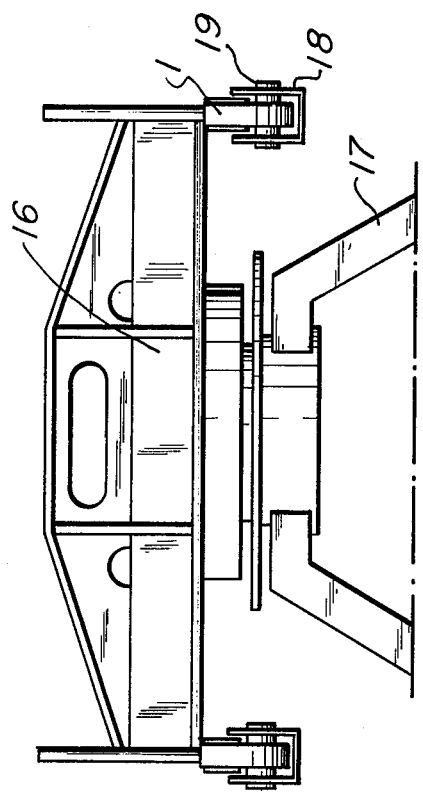
FIG. 8 is a front elevational view of the load-weighing device of the resent invention mounted in a suitable lifting device.

Referring first to FIGS. 8 and 9, there is shown a closed frame 1 of the load-weighing device of the present invention mounted in a suitable lifting device for lifting the load. The lifting device includes a load-carrying member including a yoke 16 to which the closed frame 1 of the load-weighing device is secured, for example, by welding the yoke 16 to the upper portion of the closed frame 1. The load-carrying member further includes a pair of jaws or gripping means 17 mounted on yoke 16 for lifting the load. In addition, as shown most clearly in FIG. 8, the load-weighing device of the present invention is mounted on each end of yoke 16. The lifting device or crane is preferably provided with two parallel jibs 18, which are connected via an axle journal 19 to each of the load-weighing devices.

Turning now to FIGS. 1 through 7, the closed frame 1 of the load-weighing device of the present invention is provided with a cylindrically-shaped surface 2 at its lower end. A bearing block 3 is mounted within the space defined by frame 1, and the lower surface of bearing block 3 includes a cylindrically-shaped surface 4 spaced from the cylindrically-shaped surface 2 to define a clearance. The bearing block 3 is provided with a through hole 5 extending in a direction perpendicular to the plane of frame 1. Hole 5 of bearing block 3 is arranged to receive axle journal 19 which is connected to jib 18. Bearing block 3 is also provided with a cylindrically-shaped upper surface 6 whose radius of curvature extends in a direction perpendicular to the axis of hole 5. As will be explained below, upon the application of a load to jaws 17, cylindrically-shaped surfaces 2, 4 move relative to each other to eliminate the clearance space between the two surfaces, so that the force is transferred from jaws 17 to the frame 1 of the load-weighing device and to the jib 18 via the bearing block 3 and the axle journal 19.

A bearing member 7 is also mounted in frame 1 and is provided with a lower surface 8 which is also cylindrically shaped. Preferably, the radius of curvature of cylindrical surfaces 6, 8 is substantially equal. In frame 1, the bearing block 3 and the bearing member 7 are arranged so that cylindrically-shaped surfaces 6, 8 abut each other.

The bearing member 7 is provided with a recess 12, which may be opened from the side by means of a removable portion 13 of bearing member 7. A pressure-sensitive member 9 is mounted within recess 12, and the upper section of frame 1 is covered by plates 10, 11, at least one of which is removable so that pressure-sensitive member 9 can be removed from recess 12. A passage 14 is provided for connecting lines to pressure-sensitive member 9 which extend through frame 1 and bearing member 7. A partition wall 15 is also provided within the space defined by frame 1 and is arranged to be abutted by pressure-sensitive member 9.

In operation, the force of a load is transferred from jaws 17 and yoke 16 to frame 1 and pressure-sensitive member 9. As pressure-sensitive member 9 is mounted in bearing member 7, this force is further transferred from pressure-sensitive member 9 to bearing member 7, and through contacting surfaces 6, 8, the force is transferred to bearing block 3. As axle journal 19 is mounted in hole 5 of bearing block 3, the force is further transferred by axle journal 19 to the jib 18 of the lifting device.

The compression of pressure-sensitive member 9 between partition wall 15 of frame 1, and bearing member 7 and bearing block 3 operates to provide a load-measuring value of the load in question. The pressure-sensitive member 9 then operates to emit a signal proportional to the weight of the load, which signal is delivered to a receiver means and a register. As a result, it is possible to accumulate the load-measuring value in the register and thereby indicate the total weight of the loads which have been lifted by the lifting device.

It should be noted that, upon the application of a load to the load-carrying member, the clearance space between cylindrically-shaped surfaces 2, 4 is eliminated so that the force is transferred from the frame 1 of the load-weighing device via bearing block 3 to the axle journal 19 of the lifting device. In this manner, the force of the load is relieved from pressure-sensitive member 9.

Moreover, it should also be understood that as a result of the cylindrically-shaped surfaces 6, 8, which are in contact with each other between bearing block 3 and bearing member 7, that pressure-sensitive member 9 will always be compressed along its longitudinal axis. This results even if the load is unevenly distributed or skewed in the jaws 17 of the load-carrying member, or even if the lifting device or crane is positioned on a non-planar surface on a rough terrain. More particularly, such an uneven distribution of the load or non-planar positioning of the lifting device may cause a change in the angle between axle journal 19 of the lifting device and the plane of the frame 1 of the load-weighing device of the present invention. If such a change in the angle occurs, bearing block 3 will rotate and contact surfaces 6, 8 will move relative to each other. Because of their cylindrical surfaces, pressure-sensitive member 9 will still be compressed along its longitudinal axis and will thereby not be affected by an unevenly distributed load or by the lifting device being in a non-planar position. As a result, an accurate indication of the weight of the load is still provided even under such circumstances. Moreover, it should also be pointed out that the load-weighing device of the present invention is not affected by outside impacts.

A latitude of modification, change, and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. A load-weighing device for indicating the weight of a load and for attachment to the load-carrying member of a lifting device, comprising:
   a frame connected to said load-carrying member, the lower part of said frame including a curved surface,
   a bearing block mounted in said frame for rotation relative to said load-carrying member, the upper surface of said bearing block having a curved shape, and the lower surface of said bearing block being curved, said bearing block being mounted in said frame to provide a clearance space between the curved surface of said frame and the lower curved surface of said bearing block, which clearance space is eliminated upon the application of a load,
   a bearing member mounted in said frame and abutting said upper curved surface, and
   a pressure-sensitive member mounted in said bearing member so that the force of a load is transferred by the lifting device to the pressure-sensitive member which operates to provide an accurate load-measuring value regardless of the distribution of the load or the non-planar positioning of the lifting device.

2. A load-weighing device in accordance with claim 1, wherein the upper curved surface of said bearing block is cylindrically shaped and wherein the abutting lower surface of said bearing member is cylindrically shaped.

3. A load-weighing device in accordance with claim 1, wherein said bearing member is provided with a recess in which said pressure-sensitive member may be removably mounted.

4. A load-weighing device in accordance with claim 3, wherein said recess is removably covered by a cover plate so that the pressure-sensitive member maybe removed from said recess.

* * * * *